United States Patent
Zhang et al.

(10) Patent No.: US 10,931,385 B2
(45) Date of Patent: Feb. 23, 2021

(54) DOUBLE-PATH SWITCHING TX POWER (SWTP) DETECTION CIRCUIT AND APPARATUS, AND MOBILE TERMINAL

(71) Applicant: JRD Communication (Shenzhen) LTD., Shenzhen (CN)

(72) Inventors: Sheng Zhang, Shenzhen (CN); Zhihao Zheng, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/766,755

(22) PCT Filed: Nov. 27, 2018

(86) PCT No.: PCT/CN2018/117599
§ 371 (c)(1),
(2) Date: May 26, 2020

(87) PCT Pub. No.: WO2019/101209
PCT Pub. Date: May 31, 2019

(65) Prior Publication Data
US 2020/0374016 A1    Nov. 26, 2020

(30) Foreign Application Priority Data
Nov. 27, 2017 (CN) .......................... 201711204194.7

(51) Int. Cl.
*H04B 17/16* (2015.01)
*H04B 1/16* (2006.01)
(Continued)

(52) U.S. Cl.
CPC .......... *H04B 17/16* (2015.01); *H04B 1/1615* (2013.01); *H04B 17/102* (2015.01); *H04M 1/24* (2013.01)

(58) Field of Classification Search
CPC .... H04B 17/16; H04B 1/1615; H04B 17/102; H04M 1/24
See application file for complete search history.

(56) References Cited

U.S. PATENT DOCUMENTS

| | | | | |
|---|---|---|---|---|
| 7,149,489 B2 * | 12/2006 | Hong | ..................... | H04B 1/406 455/269 |
| 7,415,295 B2 * | 8/2008 | Tran | ..................... | H01Q 1/243 342/375 |

(Continued)

FOREIGN PATENT DOCUMENTS

| | | |
|---|---|---|
| CN | 1993903 | 7/2007 |
| CN | 106877889 | 6/2017 |

(Continued)

OTHER PUBLICATIONS

International Search Report and the Written Opinion dated Mar. 7, 2019 From the International Searching Authority Re. Application No. PCT/2018/117599 and Its Translation of Search Report Into English. (9 Pages).

*Primary Examiner* — Kenneth T Lam

(57) ABSTRACT

Disclosed is a double-path switching TX power detection circuit. A first detection module is separately connected to a power supply, a first radio frequency connector, and a second radio frequency connector; a second detection unit is connected to the second radio frequency connector; the first detection module and the second detection module control a current path of the power supply according to access states of the first radio frequency connector and the second radio frequency connector, respectively; the first detection module outputs a corresponding detection level signal, to determine whether a switching TX power function is enabled or disabled.

20 Claims, 2 Drawing Sheets

(51) Int. Cl.
*H04M 1/24* (2006.01)
*H04B 17/10* (2015.01)

(56) References Cited

U.S. PATENT DOCUMENTS

| | | |
|---|---|---|
| 8,989,677 B2 | 3/2015 | Leinonen et al. |
| 9,559,791 B2* | 1/2017 | Chen ..................... H04B 15/00 |
| 2007/0298798 A1 | 12/2007 | Hagerman et al. |
| 2012/0044022 A1* | 2/2012 | Walker ................... H03F 3/245 |
| | | 330/296 |
| 2014/0129425 A1 | 5/2014 | Yang et al. |
| 2015/0372656 A1* | 12/2015 | Mow ...................... H04B 17/29 |
| | | 455/77 |
| 2017/0310403 A1* | 10/2017 | Nardozza ............... H04B 17/19 |
| 2020/0321990 A1* | 10/2020 | Wu ....................... H04B 1/1615 |
| 2020/0322066 A1* | 10/2020 | Feng ................... H04B 17/102 |

FOREIGN PATENT DOCUMENTS

| | | |
|---|---|---|
| CN | 107919919 | 4/2018 |
| WO | WO 2009/083647 | 7/2009 |
| WO | WO 2019/101209 | 5/2019 |

\* cited by examiner

DOUBLE-PATH SWITCHING TX POWER (SWTP) DETECTION CIRCUIT AND APPARATUS, AND MOBILE TERMINAL

RELATED APPLICATIONS

This application is a National Phase of PCT Patent Application No. PCT/CN2018/117599 having International filing date of Nov. 27, 2018, which claims the benefit of priority of Chinese Patent Application No. 201711204194.7 filed on Nov. 27, 2017. The contents of the above applications are all incorporated by reference as if fully set forth herein in their entirety.

FIELD AND BACKGROUND OF THE INVENTION

The present invention relates to communication technologies, and more particularly to a double-path switching TX power detection circuit, apparatus and mobile terminal.

SUMMARY OF THE INVENTION

At present, cell phone terminal platforms, no matter from MTK or Qualcomm, supports a switching TX Power (SWTP) function, that is, a transmission power switching function. This function is primarily applied to projects with all the body made of metal or used in hand holding simulation. The two situations may deteriorate total radiated power (TRP). One may use the switching TX power function to force an increase of radiated power of an antenna. However, after a prototype of the cell phone is calibrated to a target power, the power is basically stable and will not be changed due to the test environment to cause a large variation of power. Accordingly, an additional power compensation value may be needed only in a radiation environment. For this circumstance, a platform mechanism can be established. If the platform detects that a current state of the cell phone prototype is a conducted mode, the SWTP function can be disabled. When it is detected that the current state is a radiation state, the SWTP function is forced to be enabled. This way is used to solve the problem of low antenna efficiency.

However, current platforms only support a single SWTP function. If there are two antennas for primary radio frequency and each of the antennas requires to be equipped with the SWTP function, one solution for this is that two independent SWTP detection paths are provided and one Vdet corresponds to one general-purpose input/output (GPIO) port. Although the schematic design can meet the requirements of this function, current MTK platforms does not support two or more than two GPIO ports used in detecting Vdet voltage levels. Therefore, this approach cannot be practiced in actual projects for now. In another approach, a single pole double throw (SPDT) switch may be used to connect Vdet1 and Vdet2. In this way, only one GPIO port may be used to control the two states. However, the GPIO port for controlling radio frequency modules needs to be operated in a BPI mode, and for the MTK platforms, there are relatively few ports that can be used in the BPI mode. For the relatively complex design of radio frequency (RF) architectures, BPI ports is never enough.

Therefore, the existing arts are needed to be improved.

An embodiment of the present invention provides a double-path switching TX power (SWTP) detection circuit, apparatus and mobile terminal, which can ensure that each antenna has a SWTP function when there are two antennas for primary radio frequency, and at the same time can also compensate for the platforms not supporting multi-port detection.

In a first aspect, an embodiment of the present invention provides a double-path switching TX power (SWTP) detection circuit, connected to two antenna paths, including a first radio frequency connector, a second radio frequency connector, a first detection module and a second detection module, the first detection module connected to a power supply, the first radio frequency connector and the second detection module, the first detection module further connected to a first antenna end, a first radio frequency end and a detection port of the two antenna paths; the second detection module further connected to the second radio frequency connector and further connected to a second antenna end and a second radio frequency end of the two antenna paths; wherein the first detection module and the second detection module control a current path of the power supply according to access states of the first radio frequency connector and the second radio frequency connector and the first detection module correspondingly outputs a level detection signal to disable a switching TX power function when the first radio frequency connector and/or the second radio frequency connector connects to a radio frequency connection line, and to enable the switching TX power function otherwise.

In the circuit, the first detection module is configured to output a high voltage level to disable the switching TX power function when the first radio frequency connector and/or the second radio frequency connector connects to the radio frequency connection line, and output a low voltage level to enable the switching TX power function when both of the first radio frequency connector and the second radio frequency connector do not connect to the radio frequency connection line.

In the circuit, the first detection module includes a voltage dividing unit for dividing a voltage, a filtering unit for filtering signals, and a direct current blocking unit for blocking direct current, and wherein a first end of the voltage dividing unit connects to the power supply via the filtering unit, a second end of the voltage dividing unit connects to the detection port, and a third end of the voltage dividing unit connects to the first radio frequency connector and the direct current blocking unit.

In the circuit, the voltage dividing unit includes a first resistor and a second resistor, one end of the first resistor connects to the direct current blocking unit and a first end of the first radio frequency connector, the other end of the first resistor connects to one end of the second resistor, the filtering unit and the detection port, and wherein the other end of the second resistor connects to the power supply via the filtering unit.

In the circuit, the direct current blocking unit includes a first capacitor and a second capacitor, the first detection module further includes a first inductor, wherein a positive electrode of the first capacitor connects to the one end of the first resistor and a negative electrode of the first capacitor connects to the first antenna end, wherein a negative electrode of the second capacitor connects to a second end of the first radio frequency connector and the second detection module and a positive electrode of the second capacitor connects to the first radio frequency end and is further grounded via the first inductor.

In the circuit, the filtering unit includes a third capacitor, a fourth capacitor and a second inductor, wherein a negative electrode of the third capacitor connects to the other end of the second resistor and one end of the second inductor, the other end of the second inductor connects to the power supply, wherein a negative electrode of the fourth capacitor connects to the one end of the second resistor and the detection port, wherein both of a positive electrode of the third capacitor and a positive electrode of the fourth capacitor are grounded.

In the circuit, the second detection module includes a fifth capacitor, a sixth capacitor, a seventh capacitor, an eighth capacitor, a third inductor, a fourth inductor and a fifth inductor, wherein one end of the third inductor connects to the second end of the first radio frequency connector and the negative electrode of the second capacitor, the other end of the third inductor connects to a positive electrode of the sixth capacitor, a negative electrode of the seventh capacitor and one end of the fourth inductor, wherein the other end of the fourth inductor connects to a first end of the second radio frequency connector and a positive electrode of the fifth capacitor, wherein a second end of the second radio frequency connector connects to a negative electrode of the eighth capacitor and is further grounded via the fifth inductor, wherein a negative electrode of the fifth capacitor connects to the second antenna end, both of a negative electrode of the sixth capacitor and a positive electrode of the seventh capacitor are grounded, wherein a positive electrode of the eighth capacitor connects to the second radio frequency end.

In the circuit, inductance of the fifth inductor is 56 nH.

In a second embodiment, an embodiment of the present invention provides a double-path switching TX power (SWTP) detection apparatus, including a printed circuit board (PCB), a double-path switching TX power detection circuit disposed on the PCB; the double-path switching TX power detection circuit connected to two antenna paths and including a first radio frequency connector, a second radio frequency connector, a first detection module and a second detection module, the first detection module connected to a power supply, the first radio frequency connector and the second detection module, the first detection module further connected to a first antenna end, a first radio frequency end and a detection port of the two antenna paths; the second detection module further connected to the second radio frequency connector and further connected to a second antenna end and a second radio frequency end of the two antenna paths; wherein the first detection module and the second detection module control a current path of the power supply according to access states of the first radio frequency connector and the second radio frequency connector and the first detection module correspondingly outputs a level detection signal to disable a switching TX power function when the first radio frequency connector and/or the second radio frequency connector connects to a radio frequency connection line, and to enable the switching TX power function otherwise.

The first detection module is configured to output a high voltage level to disable the switching TX power function when the first radio frequency connector and/or the second radio frequency connector connects to the radio frequency connection line, and output a low voltage level to enable the switching TX power function when both of the first radio frequency connector and the second radio frequency connector do not connect to the radio frequency connection line.

The first detection module includes a voltage dividing unit for dividing a voltage, a filtering unit for filtering signals, and a direct current blocking unit for blocking direct current, and wherein a first end of the voltage dividing unit connects to the power supply via the filtering unit, a second end of the voltage dividing unit connects to the detection port, and a third end of the voltage dividing unit connects to the first radio frequency connector and the direct current blocking unit.

The voltage dividing unit includes a first resistor and a second resistor, one end of the first resistor connects to the direct current blocking unit and a first end of the first radio frequency connector, the other end of the first resistor connects to one end of the second resistor, the filtering unit and the detection port, and wherein the other end of the second resistor connects to the power supply via the filtering unit.

The direct current blocking unit includes a first capacitor and a second capacitor, the first detection module further includes a first inductor, wherein a positive electrode of the first capacitor connects to the one end of the first resistor and a negative electrode of the first capacitor connects to the first antenna end, wherein a negative electrode of the second capacitor connects to a second end of the first radio frequency connector and the second detection module and a positive electrode of the second capacitor connects to the first radio frequency end and is further grounded via the first inductor.

The filtering unit includes a third capacitor, a fourth capacitor and a second inductor, wherein a negative electrode of the third capacitor connects to the other end of the second resistor and one end of the second inductor, the other end of the second inductor connects to the power supply, wherein a negative electrode of the fourth capacitor connects to the one end of the second resistor and the detection port, wherein both of a positive electrode of the third capacitor and a positive electrode of the fourth capacitor are grounded.

The second detection module includes a fifth capacitor, a sixth capacitor, a seventh capacitor, an eighth capacitor, a third inductor, a fourth inductor and a fifth inductor, wherein one end of the third inductor connects to the second end of the first radio frequency connector and the negative electrode of the second capacitor, the other end of the third inductor connects to a positive electrode of the sixth capacitor, a negative electrode of the seventh capacitor and one end of the fourth inductor, wherein the other end of the fourth inductor connects to a first end of the second radio frequency connector and a positive electrode of the fifth capacitor, wherein a second end of the second radio frequency connector connects to a negative electrode of the eighth capacitor and is further grounded via the fifth inductor, wherein a negative electrode of the fifth capacitor connects to the second antenna end, both of a negative electrode of the sixth capacitor and a positive electrode of the seventh capacitor are grounded, wherein a positive electrode of the eighth capacitor connects to the second radio frequency end.

In a third aspect, an embodiment of the present invention provides a mobile terminal, including a double-path switching TX power (SWTP) detection apparatus, the double-path switching TX power detection apparatus including a printed circuit board (PCB), a double-path switching TX power detection circuit disposed on the PCB; the double-path switching TX power detection circuit connected to two antenna paths and including a first radio frequency connector, a second radio frequency connector, a first detection module and a second detection module, the first detection module connected to a power supply, the first radio frequency connector and the second detection module, the first detection module further connected to a first antenna end, a first radio frequency end and a detection port of the two antenna paths; the second detection module further connected to the second radio frequency connector and further connected to a second antenna end and a second radio frequency end of the two antenna paths; wherein the first detection module and the second detection module control a current path of the power supply according to access states of the first radio frequency connector and the second radio frequency connector and the first detection module correspondingly outputs a level detection signal to disable a switching TX power function when the first radio frequency connector and/or the second radio frequency connector connects to a radio frequency connection line, and to enable the switching TX power function otherwise.

The first detection module is configured to output a high voltage level to disable the switching TX power function when the first radio frequency connector and/or the second radio frequency connector connects to the radio frequency connection line, and output a low voltage level to enable the switching TX power function when both of the first radio frequency connector and the second radio frequency connector do not connect to the radio frequency connection line.

The first detection module includes a voltage dividing unit for dividing a voltage, a filtering unit for filtering signals, and a direct current blocking unit for blocking direct current, and wherein a first end of the voltage dividing unit connects to the power supply via the filtering unit, a second end of the voltage dividing unit connects to the detection port, and a third end of the voltage dividing unit connects to the first radio frequency connector and the direct current blocking unit.

The voltage dividing unit includes a first resistor and a second resistor, one end of the first resistor connects to the direct current blocking unit and a first end of the first radio frequency connector, the other end of the first resistor connects to one end of the second resistor, the filtering unit and the detection port, and wherein the other end of the second resistor connects to the power supply via the filtering unit.

The direct current blocking unit includes a first capacitor and a second capacitor, the first detection module further includes a first inductor, wherein a positive electrode of the first capacitor connects to the one end of the first resistor and a negative electrode of the first capacitor connects to the first antenna end, wherein a negative electrode of the second capacitor connects to a second end of the first radio frequency connector and the second detection module and a positive electrode of the second capacitor connects to the first radio frequency end and is further grounded via the first inductor.

In the double-path switching TX power detection circuit, apparatus and mobile terminal provided in the present invention, the double-path switching TX power detection circuit includes the first radio frequency connector, the second radio frequency connector, the first detection module and the second detection module. The first detection module is connected to the power supply, the first radio frequency connector and the second connector. The second detection unit is further connected to the second radio frequency connector. The first detection module and the second detection module control the current path of the power supply according to the access states of the first radio frequency connector and the second radio frequency connector, respectively, and the first detection module correspondingly outputs the level detection signal. Only one detection port is needed to output the level detection signal to meet the requirement of having the SWTP function for each antenna when there are two antennas for primary radio frequency. Meanwhile, it can also compensate for the platforms not supporting multi-port detection.

DESCRIPTION OF SPECIFIC EMBODIMENTS OF THE INVENTION

Figure 1:
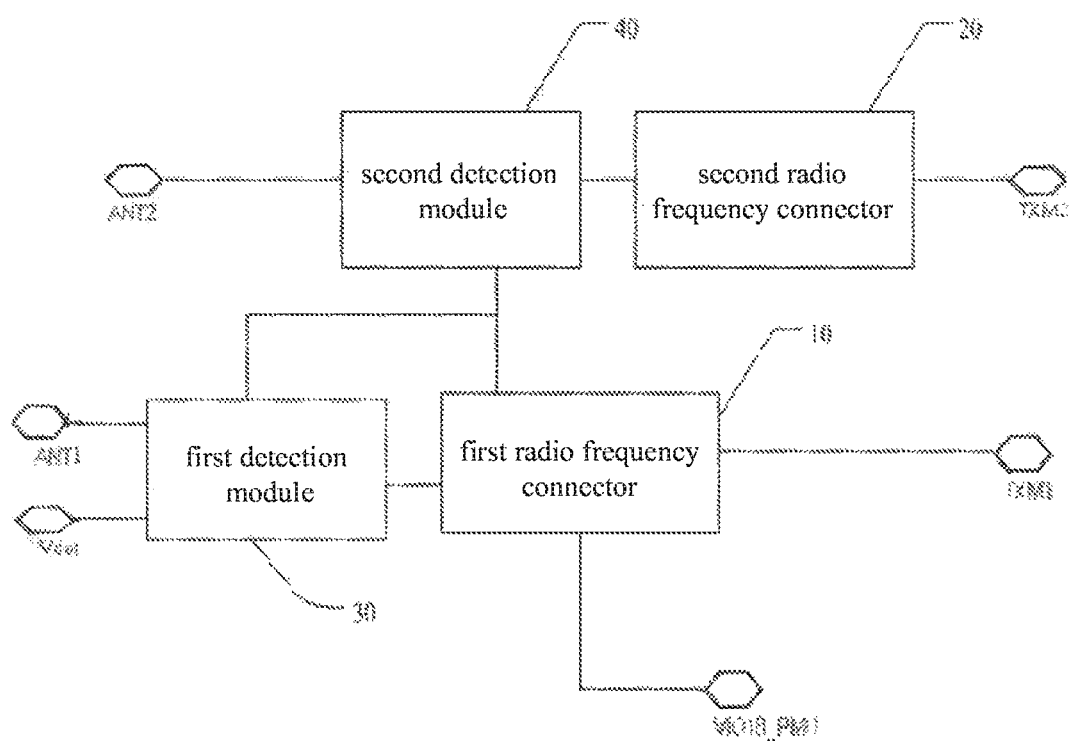
FIG. 1 is a structural block diagram illustrating a double-path switching TX power detection circuit provided according to an embodiment of the present invention.

The present invention provides a double-path switching TX power (SWTP) detection circuit, apparatus and mobile terminal, which can ensure that each antenna has a SWTP function when there are two antennas for primary radio frequency, and at the same time can also compensate for the platforms not supporting multi-port detection.

To make the objectives, technical schemes, and effects of the present invention more clear and specific, the present invention is described in further detail below with reference to the embodiments in accompanying with the appending drawings. It should be understood that the specific embodiments described herein are merely for interpreting the present invention and the present invention is not limited thereto.

The double-path switching TX power detection circuit provided in the present invention includes a first radio frequency connector 10, a second radio frequency connector 20, a first detection module 30 and a second detection module 40. The first detection module 30 is connected to a power supply, the first radio frequency connector 10 and the second detection module 40. The second detection module 40 is further connected to the second radio frequency connector 20. The first detection module 30 and the second detection module 40 control a current path of the power supply according to access states of the first radio frequency connector 10 and the second radio frequency connector 20 and the first detection module 30 correspondingly outputs a level detection signal to disable a switching TX power function when the first radio frequency connector 10 and/or the second radio frequency connector 20 connects to a radio frequency connection line, and to enable the switching TX power function otherwise.

The present invention controls the current path of the power supply by detecting the access states of the first radio frequency connector 10 and the second radio frequency connector 20 such that a corresponding level detection signal can be outputted based on different access states. A current state of the mobile terminal is determined based on the level detection signal to enable or disable the switching TX power function. Only a detection port is needed for meeting the demands on detecting and controlling the SWTP function for two antenna paths. This also compensates for the current platforms not supporting multi-functional detection.

Further, the first detection module 30 is configured to output a high voltage level to disable the switching TX power function when the first radio frequency connector 10 and/or the second radio frequency connector 20 connects to the radio frequency connection line. A low voltage level is outputted to enable the switching TX power function when both of the first radio frequency connector 10 and the second radio frequency connector 20 do not connect to the radio frequency connection line. That is, as long as one radio frequency connector is connected, it is determined to be in a conducted state and enabling the switching TX power function is needless. It is determined to be in a coupled state only when both of the two radio frequency connectors are connected, and meanwhile the switching TX power function is enabled to compensate a loss of power, thereby achieving the detection and control of the switching TX power function for two antenna paths.

Specifically speaking, when the first radio frequency connector 10 and the second radio frequency connector 20 are simultaneously connected to the radio frequency connection line, both of one end of the first radio frequency connector 10 and one end of the second radio frequency connector 20 are in a disconnected state, the current of the power supply cannot flow through the first radio frequency connector 10 to reach the second detection module 40, and thus only the first detection module 30 is conducted. Meanwhile, the output of the first detection module 30 is the high voltage level, and it is determined to be in the conducted state and the switching TX power function is disabled. Similarly, when only the first radio frequency connector 10 is connected, one end of the first radio frequency connector 10 is disconnected and the second radio frequency connector 20 is conducted. Likewise, the current of the power supply cannot flow through the first radio frequency connector 10 to reach the second detection module 40. The first detection module 30 outputs the high voltage level signal, and it is also determined to be in the conducted state and the switching TX power function is disabled. When only the second radio frequency connector 20 is connected, the first radio frequency connector 10 is in the conducted state but one end of the second radio frequency connector 20 is disconnected such that the current cannot flow through the second detection module 40 to reach the ground. Meanwhile, the first detection module 30 still outputs the high voltage level, and it is determined to be in the conducted state and the switching TX power function is disabled.

When both of the first radio frequency connector 10 and the second radio frequency connector 20 are not connected, that is, the first radio frequency connector 10 and the second radio frequency connector 20 are conducted or paths of which are established, both of a first antenna end and a second antenna end maintain in the conducted state. Meanwhile, the current of the power supply can flow through the second detection module 40 to reach the ground. The first detection module 30 outputs the low voltage level, and it can be determined to the coupled state and the switching TX power function is enabled.

Figure 2:
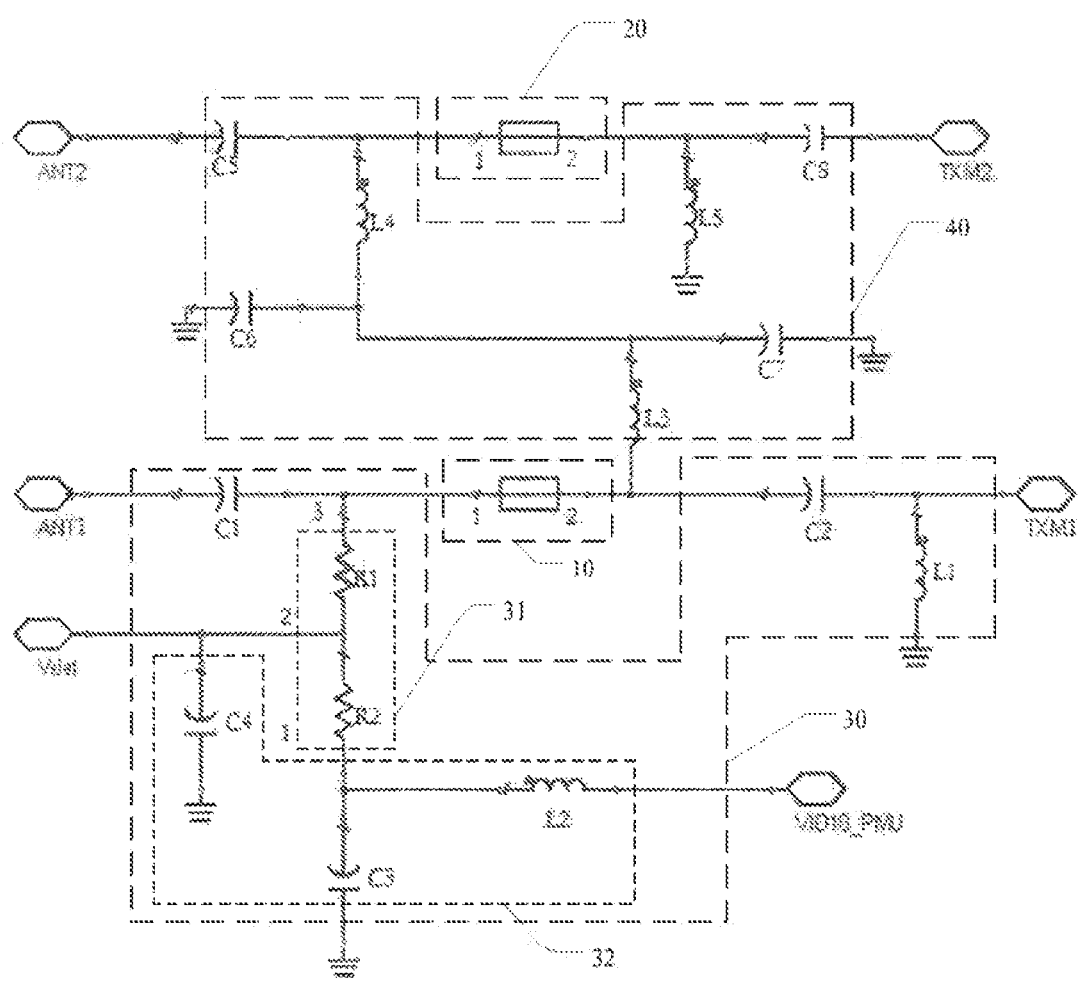
FIG. 2 is a diagram illustrating the principle of a double-path switching TX power detection circuit provided according to an embodiment of the present invention.

Specifically, referring to FIG. 2 also, the first detection module 10 includes a voltage dividing unit 31 for dividing a voltage, a filtering unit 32 for filtering signals, and a direct current blocking unit (not labeled in the figure) for blocking direct current. A first end of the voltage dividing unit 31 connects to the power supply VIO18_PMU via the filtering unit 32, a second end of the voltage dividing unit 31 connects to the detection port Vdet, and a third end of the voltage dividing unit 31 connects to the first radio frequency connector 10 and the direct current blocking unit.

By the direct current blocking unit with cooperation of the first detection module 30, the current path of the power supply is controlled based on the access state of the first radio frequency connector 10. The filtering unit 32 can effectively filter clutter and avoid interference and thus improve stability of the detection circuit. Also, when both of the first radio frequency connector 10 and the second radio frequency connector 20 are not connected to the radio frequency connection line, the voltage dividing unit 31 divides the voltage of the power supply so as to output the low voltage level to control the switching TX power function to be enabled, thereby realizing the SWTP function for two antenna paths.

In concrete implementations, the voltage dividing unit 31 includes a first resistor R1 and a second resistor R2, one end of the first resistor R1 connects to the direct current blocking unit and a first end of the first radio frequency connector 10, the other end of the first resistor R1 connects to one end of the second resistor R2, the filtering unit 32 and the detection port Vdet, and the other end of the second resistor R2 connects to the power supply VIO18_PMU via the filtering unit 32. When both of the first radio frequency connector 10 and the second radio frequency connector 20 are connected, the two antenna paths are conducted and the current can smoothly reach the ground via the second detection module 40. Meanwhile, the first resistor R1 and the second resistor R2 divides the voltage of the power supply. The voltage detected by a detection port Vdet connected to the first detection module 30 is a divided voltage value on the first resistor R1. Accordingly, the low voltage level is outputted. This represents that it is in the coupled state and the SWTP function will be enabled.

Further, the direct current blocking unit includes a first capacitor C1 and a second capacitor C2. The first detection module 30 further includes a first inductor L1. A positive electrode of the first capacitor C1 connects to the one end of the first resistor R1 and a negative electrode of the first capacitor C1 connects to the first antenna end ANT1. A negative electrode of the second capacitor C2 connects to a second end of the first radio frequency connector 10 and the second detection module 40 and a positive electrode of the second capacitor C2 connects to the first radio frequency end TXM1 and is further grounded via the first inductor L1. When the first radio frequency connector 10 is not connected, the second capacitor C2 blocks a direct current flowing into the circuit such that the current directly flows to the second detection module 40 via the path of the first radio frequency connector 10, thereby effectively controlling the current path.

The filtering unit 32 includes a third capacitor C3, a fourth capacitor C4 and a second inductor L2. A negative electrode of the third capacitor C3 connects to the other end of the second resistor R2 and one end of the second inductor L2, the other end of the second inductor L2 connects to the power supply VIO18_PMU, A negative electrode of the fourth capacitor C4 connects to the one end of the second resistor R2 and the detection port Vdet such that the detection port Vdet can detect a voltage level signal that is stable. Both of a positive electrode of the third capacitor C3 and a positive electrode of the fourth capacitor C4 are grounded. By using the third capacitor C3, the fourth capacitor C4 and the second inductor L2, the whole double-path switching TX power detection circuit can obtain a stable voltage level signal without interference.

The second detection module 40 includes a fifth capacitor C5, a sixth capacitor C6, a seventh capacitor C7, an eighth capacitor C8, a third inductor L3, a fourth inductor L4 and a fifth inductor L5. One end of the third inductor L3 connects to the second end of the first radio frequency connector 10 and the negative electrode of the second capacitor C2, the other end of the third inductor L3 connects to a positive electrode of the sixth capacitor C6, a negative electrode of the seventh capacitor C7 and one end of the fourth inductor L4, the other end of the fourth inductor L5 connects to a first end of the second radio frequency connector 20 and a positive electrode of the fifth capacitor C5, a second end of the second radio frequency connector 20 connects to a negative electrode of the eighth capacitor C8 and is further grounded via the fifth inductor L5, a negative electrode of the fifth capacitor C5 connects to the second antenna end ANT2, both of a negative electrode of the sixth capacitor C6 and a positive electrode of the seventh capacitor C7 are grounded, a positive electrode of the eighth capacitor C8 connects to the second radio frequency end TXM2. In the present embodiment, the inductance of the fifth inductor L5 is 56 nH.

When the first radio frequency connector 10 is not connected to the radio frequency connection line, the current flows into the second detection module 40 under the direct current blocking action of the second capacitor C2. Further, whether the current is able to reach the ground via the fifth inductor L5 of the second detection module 40 is determined or controlled based on the access state of the second radio frequency connector 20. Specifically, when the second radio frequency connector 20 is connected to the radio frequency connection line, the first end of the second radio frequency connector 20 is disconnected and meanwhile, the current cannot reach the ground via the fifth inductor L5. The first resistor R1 and the second resistor R2 of the voltage dividing unit 31 will not divide the voltage of the power supply. Meanwhile, the detection port Vdet outputs the high voltage level. It represents that it is in the conducted state and there is no need to enable the SWTP function. However, when the second radio frequency connector 20 is not connected to the radio frequency connection line too, the two antenna paths are conducted and meanwhile, the current can smoothly reach the ground from the power supply VIO18_PMU via the fifth inductor L5. The first resistor R1 and the second resistor R2 of the voltage dividing unit 31 will divide the voltage of the power supply. Meanwhile, the voltage on the detection port Vdet is a divided voltage value on the first resistor R1. Accordingly, the low voltage level is outputted. It represents that it is in the coupled state and it requires to enable the SWTP function. Therefore, by the first detection module 30 and the second detection module 40, the present invention controls the current path of the power supply based on the access states of the first radio frequency connector 10 and the second radio frequency connector 20. It is achieved that the access states can be detected as long as one detection port is used, to control enabling or disabling the SWTP function. This compensates for the platforms not supporting multi-port detection. The number of ports used is saved effectively as well.

To better understand the present invention, the principle of the double-path switching TX power detection circuit of the present invention is described in detail below with reference to FIG. 1 and FIG. 2.

At first, when the first radio frequency connector 10 and the second radio frequency connector 20 are connected to the radio frequency connection line, front ends of the first radio frequency connector 10 and the second radio frequency connector 20 are disconnected. When the first radio frequency connector 10 and the second radio frequency connector are not connected to the radio frequency connection line, the front ends of the first radio frequency connector 10 and the second radio frequency connector 20 are conducted.

Accordingly, when both of the first radio frequency connector 10 and the second radio frequency connector 20 are connected or when the first radio frequency connector 10 is connected and the second radio frequency connector 20 is not connected, the front end of the first radio frequency connector 10 is disconnected and meanwhile, the voltage of the detection port Vdet connected to the first detection module 30 is the voltage of the power supply (1.8V). The first detection module 30 outputs the high voltage level signal. It represents that the antenna path is in the conducted state and the switching TX power function is disabled.

When the first radio frequency connector 10 is not connected and the second radio frequency connector 20 is connected, the current of the power supply can flow to the first radio frequency connector 10 via the first detection module 30 and reach the second detection module 40 under the blocking action of the direct current blocking unit. However, since the front end of the second radio frequency connector 20 is connected, the current cannot reach the ground via the fifth inductor L5. Meanwhile, the voltage of the detection port of the first detection module 30 is still 1.8V. The first detection module 30 outputs the high voltage level signal. It represents that the antenna path is in the conducted state and the switching TX power function is disabled.

When both of the first radio frequency connector 10 and the second radio frequency connector 20 are not connected, the current of the power supply reaches the second detection module 40 via the first radio frequency connector 10 after flowing through the first resistor R1 and the second resistor R2 and after that, flows through the second radio frequency connector 20 to reach the ground via the fifth inductor L5. Accordingly, the voltage of the detection port Vdet connected to the first detection module 30 is a divided voltage on the first resistor R1, that is, 0.6V. The first detection module 30 outputs the low voltage level signal. It represents that the antenna path is in the coupled state and the switching TX power function is enabled.

Therefore, the requirement of having the switching TX power function for both of the two antennas with primary radio frequency on a cell phone detection platform is met. Meanwhile, with an auxiliary function of the filtering unit 32, the whole circuit can have a stable and secure voltage level signals, improve the security and stability of the detection circuit and realize effectiveness of the detection in a further step. Also, this technical scheme may be utilized to build more antenna paths having the switching TX power function to effectively compensate for the mobile terminal platforms not supporting multi-port detection.

Based on the afore-described double-path switching TX power detection circuit, the present invention correspondingly provides a double-path switching TX power detection apparatus including a printed circuit board (PCB), on which the afore-described double-path switching TX power detection circuit is disposed. Since the double-path switching TX power detection circuit has been described in detail in above context, it is not repeated herein.

The present invention further correspondingly provides a mobile terminal, which includes the afore-described double-path switching TX power detection apparatus. Since the double-path switching TX power detection apparatus has been described in detail in above context, it is not repeated herein.

Above all, the double-path switching TX power detection circuit, apparatus and mobile terminal are provided in the present invention. The detection circuit includes the first radio frequency connector, the second radio frequency connector, the first detection module and the second detection module. The first detection module is connected to the power supply, the first radio frequency connector and the second connector. The second detection unit is further connected to the second radio frequency connector. The first detection module and the second detection module control the current path of the power supply according to the access states of the first radio frequency connector and the second radio frequency connector, respectively, and the first detection module correspondingly outputs the level detection signal to determine whether to enable or disable the switching TX power function. When there are two antennas for primary radio frequency, both of the two antennas can realize the switching TX power function and meanwhile, compensate for the platforms not supporting multi-port detection.

It should be understood that those of ordinary skill in the art may make equivalent modifications or variations according to the technical schemes and invention concepts of the present invention, but all such modifications and variations should be within the appended claims.

What is claimed is:

1. A double-path switching TX power (SWTP) detection circuit, connected to two antenna paths, comprising a first radio frequency connector, a second radio frequency connector, a first detection module and a second detection module, the first detection module connected to a power supply, the first radio frequency connector and the second detection module, the first detection module further connected to a first antenna end, a first radio frequency end and a detection port of the two antenna paths; the second detection module further connected to the second radio frequency connector and further connected to a second antenna end and a second radio frequency end of the two antenna paths; wherein the first detection module and the second detection module control a current path of the power supply according to access states of the first radio frequency connector and the second radio frequency connector and the first detection module correspondingly outputs a level detection signal to disable a switching TX power function when the first radio frequency connector and/or the second radio frequency connector connects to a radio frequency connection line, and to enable the switching TX power function otherwise.

2. The circuit according to claim 1, wherein the first detection module is configured to output a high voltage level to disable the switching TX power function when the first radio frequency connector and/or the second radio frequency connector connects to the radio frequency connection line, and output a low voltage level to enable the switching TX power function when both of the first radio frequency connector and the second radio frequency connector do not connect to the radio frequency connection line.

3. The circuit according to claim 1, wherein the first detection module comprises a voltage dividing unit for dividing a voltage, a filtering unit for filtering signals, and a direct current blocking unit for blocking direct current, and wherein a first end of the voltage dividing unit connects to the power supply via the filtering unit, a second end of the voltage dividing unit connects to the detection port, and a third end of the voltage dividing unit connects to the first radio frequency connector and the direct current blocking unit.

4. The circuit according to claim 3, wherein the voltage dividing unit comprises a first resistor and a second resistor, one end of the first resistor connects to the direct current blocking unit and a first end of the first radio frequency connector, the other end of the first resistor connects to one end of the second resistor, the filtering unit and the detection port, and wherein the other end of the second resistor connects to the power supply via the filtering unit.

5. The circuit according to claim 4, wherein the direct current blocking unit comprises a first capacitor and a second capacitor, the first detection module further comprises a first inductor, wherein a positive electrode of the first capacitor connects to the one end of the first resistor and a negative electrode of the first capacitor connects to the first antenna end, wherein a negative electrode of the second capacitor connects to a second end of the first radio frequency connector and the second detection module and a positive electrode of the second capacitor connects to the first radio frequency end and is further grounded via the first inductor.

6. The circuit according to claim 5, wherein the filtering unit comprises a third capacitor, a fourth capacitor and a second inductor, wherein a negative electrode of the third capacitor connects to the other end of the second resistor and one end of the second inductor, the other end of the second inductor connects to the power supply, wherein a negative electrode of the fourth capacitor connects to the one end of the second resistor and the detection port, wherein both of a positive electrode of the third capacitor and a positive electrode of the fourth capacitor are grounded.

7. The circuit according to claim 5, wherein the second detection module comprises a fifth capacitor, a sixth capacitor, a seventh capacitor, an eighth capacitor, a third inductor, a fourth inductor and a fifth inductor, wherein one end of the third inductor connects to the second end of the first radio frequency connector and the negative electrode of the second capacitor, the other end of the third inductor connects to a positive electrode of the sixth capacitor, a negative electrode of the seventh capacitor and one end of the fourth inductor, wherein the other end of the fourth inductor connects to a first end of the second radio frequency connector and a positive electrode of the fifth capacitor, wherein a second end of the second radio frequency connector connects to a negative electrode of the eighth capacitor and is further grounded via the fifth inductor, wherein a negative electrode of the fifth capacitor connects to the second antenna end, both of a negative electrode of the sixth capacitor and a positive electrode of the seventh capacitor are grounded, wherein a positive electrode of the eighth capacitor connects to the second radio frequency end.

8. The circuit according to claim 7, wherein inductance of the fifth inductor is 56 nH.

9. A double-path switching TX power (SWTP) detection apparatus, comprising a printed circuit board (PCB), a double-path switching TX power detection circuit disposed on the PCB; the double-path switching TX power detection circuit connected to two antenna paths and comprising a first radio frequency connector, a second radio frequency connector, a first detection module and a second detection module, the first detection module connected to a power supply, the first radio frequency connector and the second detection module, the first detection module further connected to a first antenna end, a first radio frequency end and a detection port of the two antenna paths; the second detection module further connected to the second radio frequency connector and further connected to a second antenna end and a second radio frequency end of the two antenna paths; wherein the first detection module and the second detection module control a current path of the power supply according to access states of the first radio frequency connector and the second radio frequency connector and the first detection module correspondingly outputs a level detection signal to disable a switching TX power function when the first radio frequency connector and/or the second radio frequency connector connects to a radio frequency connection line, and to enable the switching TX power function otherwise.

10. The apparatus according to claim 9, wherein the first detection module is configured to output a high voltage level to disable the switching TX power function when the first radio frequency connector and/or the second radio frequency connector connects to the radio frequency connection line, and output a low voltage level to enable the switching TX power function when both of the first radio frequency connector and the second radio frequency connector do not connect to the radio frequency connection line.

11. The apparatus according to claim 9, wherein the first detection module comprises a voltage dividing unit for dividing a voltage, a filtering unit for filtering signals, and a direct current blocking unit for blocking direct current, and wherein a first end of the voltage dividing unit connects to the power supply via the filtering unit, a second end of the voltage dividing unit connects to the detection port, and a third end of the voltage dividing unit connects to the first radio frequency connector and the direct current blocking unit.

12. The apparatus according to claim 11, wherein the voltage dividing unit comprises a first resistor and a second resistor, one end of the first resistor connects to the direct current blocking unit and a first end of the first radio frequency connector, the other end of the first resistor connects to one end of the second resistor, the filtering unit and the detection port, and wherein the other end of the second resistor connects to the power supply via the filtering unit.

13. The apparatus according to claim 12, wherein the direct current blocking unit comprises a first capacitor and a second capacitor, the first detection module further comprises a first inductor, wherein a positive electrode of the first capacitor connects to the one end of the first resistor and a negative electrode of the first capacitor connects to the first antenna end, wherein a negative electrode of the second capacitor connects to a second end of the first radio frequency connector and the second detection module and a positive electrode of the second capacitor connects to the first radio frequency end and is further grounded via the first inductor.

14. The apparatus according to claim 13, wherein the filtering unit comprises a third capacitor, a fourth capacitor and a second inductor, wherein a negative electrode of the third capacitor connects to the other end of the second resistor and one end of the second inductor, the other end of the second inductor connects to the power supply, wherein a negative electrode of the fourth capacitor connects to the one end of the second resistor and the detection port, wherein both of a positive electrode of the third capacitor and a positive electrode of the fourth capacitor are grounded.

15. The apparatus according to claim 13, wherein the second detection module comprises a fifth capacitor, a sixth capacitor, a seventh capacitor, an eighth capacitor, a third inductor, a fourth inductor and a fifth inductor, wherein one end of the third inductor connects to the second end of the first radio frequency connector and the negative electrode of the second capacitor, the other end of the third inductor connects to a positive electrode of the sixth capacitor, a negative electrode of the seventh capacitor and one end of the fourth inductor, wherein the other end of the fourth inductor connects to a first end of the second radio frequency connector and a positive electrode of the fifth capacitor, wherein a second end of the second radio frequency connector connects to a negative electrode of the eighth capacitor and is further grounded via the fifth inductor, wherein a negative electrode of the fifth capacitor connects to the second antenna end, both of a negative electrode of the sixth capacitor and a positive electrode of the seventh capacitor are grounded, wherein a positive electrode of the eighth capacitor connects to the second radio frequency end.

16. A mobile terminal, comprising a double-path switching TX power (SWTP) detection apparatus, the double-path switching TX power detection apparatus comprising a printed circuit board (PCB), a double-path switching TX power detection circuit disposed on the PCB; the double-path switching TX power detection circuit connected to two antenna paths and comprising a first radio frequency connector, a second radio frequency connector, a first detection module and a second detection module, the first detection module connected to a power supply, the first radio frequency connector and the second detection module, the first detection module further connected to a first antenna end, a first radio frequency end and a detection port of the two antenna paths; the second detection module further connected to the second radio frequency connector and further connected to a second antenna end and a second radio frequency end of the two antenna paths; wherein the first detection module and the second detection module control a current path of the power supply according to access states of the first radio frequency connector and the second radio frequency connector and the first detection module correspondingly outputs a level detection signal to disable a switching TX power function when the first radio frequency connector and/or the second radio frequency connector connects to a radio frequency connection line, and to enable the switching TX power function otherwise.

17. The mobile terminal according to claim 16, wherein the first detection module is configured to output a high voltage level to disable the switching TX power function when the first radio frequency connector and/or the second radio frequency connector connects to the radio frequency connection line, and output a low voltage level to enable the switching TX power function when both of the first radio frequency connector and the second radio frequency connector do not connect to the radio frequency connection line.

18. The mobile terminal according to claim 16, wherein the first detection module comprises a voltage dividing unit for dividing a voltage, a filtering unit for filtering signals, and a direct current blocking unit for blocking direct current, and wherein a first end of the voltage dividing unit connects to the power supply via the filtering unit, a second end of the voltage dividing unit connects to the detection port, and a third end of the voltage dividing unit connects to the first radio frequency connector and the direct current blocking unit.

19. The mobile terminal according to claim 18, wherein the voltage dividing unit comprises a first resistor and a second resistor, one end of the first resistor connects to the direct current blocking unit and a first end of the first radio frequency connector, the other end of the first resistor connects to one end of the second resistor, the filtering unit and the detection port, and wherein the other end of the second resistor connects to the power supply via the filtering unit.

20. The mobile terminal according to claim 19, wherein the direct current blocking unit comprises a first capacitor and a second capacitor, the first detection module further comprises a first inductor, wherein a positive electrode of the first capacitor connects to the one end of the first resistor and a negative electrode of the first capacitor connects to the first antenna end, wherein a negative electrode of the second capacitor connects to a second end of the first radio frequency connector and the second detection module and a positive electrode of the second capacitor connects to the first radio frequency end and is further grounded via the first inductor.

* * * * *